Patented Apr. 1, 1924.

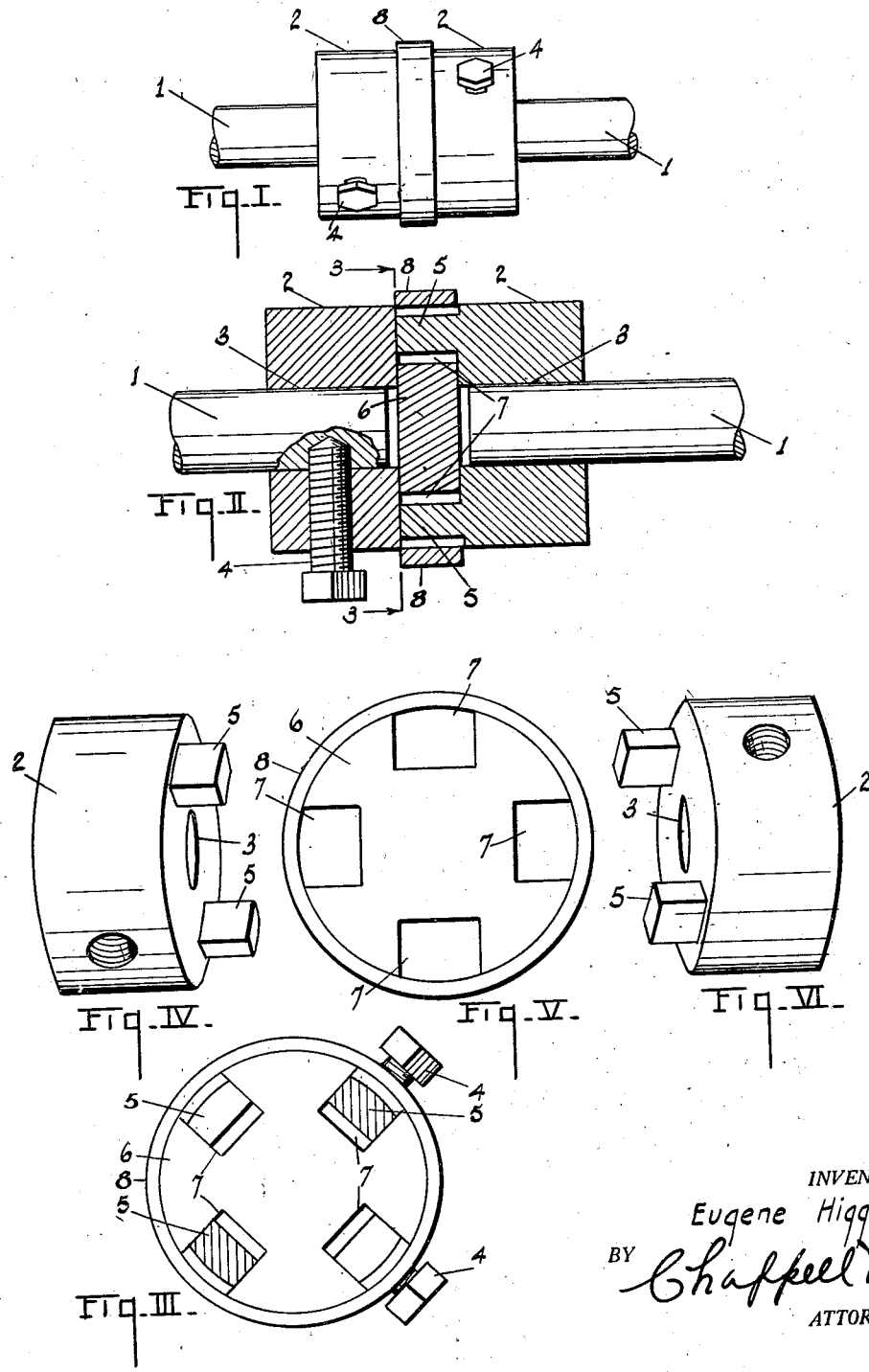

1,488,497

UNITED STATES PATENT OFFICE.

EUGENE HIGGINS, OF JACKSON, MICHIGAN.

SHAFT COUPLING.

Application filed February 7, 1922. Serial No. 534,659.

*To all whom it may concern:*

Be it known that I, EUGENE HIGGINS, a citizen of the United States, residing at the city and county of Jackson, State of Michigan, have invented certain new and useful Improvements in Shaft Couplings, of which the following is a specification.

This invention relates to improvements in shaft couplings.

The main objects of the invention are:

First, to provide an improved shaft coupling which requires no lubricant other than that which is selfcontained.

Second, to provide an improved shaft coupling having these advantages in which the parts are simple and economical and very durable.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is a side view of my improved coupling, the shaft sections being partially broken away.

Fig. II is a detail view mainly in central longitudinal section.

Fig. III is a transverse section on a line corresponding to line 3—3 of Fig. II.

Fig. IV is a perspective view of one of the shaft members.

Fig. V is an elevation of the coupling member.

Fig. VI is a perspective view of the second shaft member.

In the drawing similar reference characters refer to similar parts throughout the several views.

Referring to the drawing, 1, 1 represent the shaft sections to be coupled. The shaft members 2 are duplicates, each having a central bore 3 to receive the shaft sections which are secured by the set screws 4. Each shaft member is provided with a pair of driving lugs 5, the planes of the driving lugs of the two shaft members being disposed at right angles when the parts are in assembled relation.

I provide a cruciform coupling member 6 of self-lubricating bearing material having slot-like bearing openings 7 which coact with the driving lugs 5. This coupling member 6 is provided with a rim 8 of steel or other suitable material, the coupling member having a cylindrical periphery and the rim being a ring fitted thereon.

There are certain bearing alloys now on the market which are designated as "self-lubricating," but these do not possess sufficient strength to serve as coupling members and, therefore, I support the same by the rim 8, which may be formed of relatively thin steel and at the same time possess the required strength to support the arm-like projections of the coupling member which receives the driving lugs when the joint is in use.

My improved coupling is very simple and economical in its parts, but is strong and durable and, as stated, requires no lubrication, which is a very great advantage in couplings of this type.

Having thus described my invention, what I claim as new and desire to secure by Letters Patent, is:

1. A shaft coupling comprising a pair of shaft members each having driving lugs, a coupling comprising a cruciform member of self-lubricating bearing metal coacting with the lugs of both shaft members, and a retaining rim of steel fitted upon said coupling member and bridging the driving lug openings thereof.

2. A shaft coupling comprising a pair of shaft members each having driving lugs, a coupling comprising a cruciform member of bearing metal coacting with the lugs of both shaft members, and a rim fitted upon said coupling member and bridging the driving lug openings thereof.

3. A shaft coupling comprising a pair of shaft members each having driving lugs, a cylindrical coupling member having peripheral slots coacting with the driving lugs of both shaft members, and a supporting rim fitted upon the periphery of said coupling member and bridging the said bearing slots thereof.

4. A shaft coupling comprising a pair of shaft members each having driving lugs, a coupling member of bearing metal having peripheral slots coacting with the driving lugs of both shaft members, and a supporting rim fitted upon said coupling member and bridging the said bearing slots thereof.

5. A shaft comprising a pair of shaft members each having driving lugs, a coupling member of bearing material having bearing openings coacting with the lugs of said shaft members, and a supporting rim for said coupling member.

In witness whereof, I have hereunto set my hand and seal.

EUGENE HIGGINS. [L. S.]